United States Patent
Cheng et al.

(10) Patent No.: US 12,276,884 B1
(45) Date of Patent: Apr. 15, 2025

(54) ELECTRICALLY SWITCHABLE LIQUID CRYSTAL GRATING CELL BASED ON PHOTOALIGNMENT WITH AN AMPLITUDE MASK

(71) Applicant: The Hong Kong University of Science and Technology, Hong Kong (CN)

(72) Inventors: Yuechu Cheng, Hong Kong (CN); Abhishek Kumar Srivastava, Hong Kong (CN)

(73) Assignee: The Hong Kong University of Science and Technology, Hong Kong (CN)

( * ) Notice: Subject to any disclaimer, the term of this patent is extended or adjusted under 35 U.S.C. 154(b) by 0 days.

(21) Appl. No.: 18/498,148

(22) Filed: Oct. 31, 2023

(51) Int. Cl.
  *G02F 1/1347* (2006.01)
  *G02F 1/1337* (2006.01)
  *G02F 1/135* (2006.01)

(52) U.S. Cl.
  CPC ...... *G02F 1/133769* (2021.01); *G02F 1/1355* (2021.01); *G02F 2201/305* (2013.01); *G02F 2202/09* (2013.01)

(58) Field of Classification Search
  CPC ......... G02F 1/133769; G02F 1/133773; G02F 1/13378; G02F 1/13388; G02F 1/133757; G02F 2201/30; G02F 2201/305; G02F 2201/307; G02F 1/1355; G02F 1/1354; G02F 1/1357; G02F 2202/09; G02F 2202/08; G02F 1/1347; G02F 1/29; G02B 5/1809; G02B 5/1847; G02B 6/00
  See application file for complete search history.

(56) References Cited

U.S. PATENT DOCUMENTS

| | | | | | |
|---|---|---|---|---|---|
| 6,128,058 | A | * | 10/2000 | Walton | G02F 1/133753 349/127 |
| 2003/0067575 | A1 | * | 4/2003 | Acosta | G02F 1/1393 349/123 |
| 2004/0227883 | A1 | * | 11/2004 | Lee | G02F 1/133753 349/129 |

(Continued)

FOREIGN PATENT DOCUMENTS

| | | | | | |
|---|---|---|---|---|---|
| CN | 102947750 | A | * | 2/2013 | G02B 5/20 |
| CN | 112904629 | A | * | 6/2021 | G02F 1/13306 |

(Continued)

*Primary Examiner* — Hoan C Nguyen
(74) *Attorney, Agent, or Firm* — S&F/WEHRW

(57) ABSTRACT

A switchable liquid crystal grating cell, and methods for manufacturing the above. The switchable liquid crystal grating cell comprises a pair of switchable liquid crystal grating parts, each switchable liquid crystal grating part comprises a substrate; a conductive layer on the substrate; and a photoalignment layer with an alignment pattern above the conductive layer on the substrate, the alignment pattern having first and second types of domains, the first type of domain having a first uniform alignment direction, the second type of domain having a second uniform alignment direction that is reoriented at a predetermined angle to the first uniform alignment direction, the predetermined angle is 85°-95°, and a liquid crystal layer sandwiched between the pair of switchable liquid crystal grating parts, wherein an alignment pattern on a top surface is arranged to be shifted relative to the other alignment pattern on a bottom surface.

13 Claims, 6 Drawing Sheets

(56) References Cited

U.S. PATENT DOCUMENTS

| | | | |
|---|---|---|---|
| 2011/0027494 A1* | 2/2011 | Tan | G11B 7/1353 |
| | | | 427/508 |
| 2012/0070629 A1* | 3/2012 | Fukuda | G02B 5/3083 |
| | | | 355/18 |
| 2014/0313581 A1* | 10/2014 | Kashima | G02F 1/133711 |
| | | | 428/1.2 |
| 2015/0036084 A1* | 2/2015 | Srivastava | G02F 1/133753 |
| | | | 349/96 |
| 2016/0139314 A1* | 5/2016 | Inomata | B29D 11/00644 |
| | | | 349/193 |
| 2016/0187730 A1* | 6/2016 | Du | G02F 1/133788 |
| | | | 349/127 |
| 2019/0129256 A1* | 5/2019 | Zhao | G02F 1/133711 |
| 2022/0299825 A1* | 9/2022 | Kobashi | G02F 1/133738 |

FOREIGN PATENT DOCUMENTS

| | | | |
|---|---|---|---|
| JP | H0566395 A | * | 3/1993 |
| JP | 2006281189 A | * | 10/2006 |
| JP | 2012226218 A | * | 11/2012 |
| KR | 20160061547 A | * | 6/2016 |

* cited by examiner

ELECTRICALLY SWITCHABLE LIQUID CRYSTAL GRATING CELL BASED ON PHOTOALIGNMENT WITH AN AMPLITUDE MASK

TECHNICAL FIELD

The present application relates to the design and fabrication of liquid crystal grating cells, and in particular to electrically switchable liquid crystal grating cells.

BACKGROUND

Switchable polarization gratings are pivotal in various photonic devices, offering capabilities such as beam steering, beam shaping, and optical communication due to their ability to manipulate light. Polarization gratings are a type of optical grating that modulate the state of polarization of incident light. This is achieved through spatially varying the local optical axis, or orientation of an anisotropic material across the grating. Polarization gratings can selectively diffract different states of polarization, making them useful in a variety of optical applications.

The basis of a polarization grating is often a birefringent material, such as certain types of liquid crystals (LCs). The material is structured in such a way that the optical axis varies periodically across the grating, typically in a sinusoidal or sawtooth manner. When unpolarized or linearly polarized light incident on the grating is composed of two orthogonal polarization states, the grating effectively works by splitting the incoming light into two beams each with a different state of polarization.

LCs have emerged as the material of choice for light modulation devices, owing largely to their distinctive ability to alter the orientation of their molecular director in response to an applied electric field. By developing switchable diffraction gratings that utilize the properties of liquid crystals, a high degree of control over light propagation can be achieved, thereby facilitating the production of more adaptable and dynamic photonic devices.

Various methodologies for the fabrication of switchable liquid crystal gratings have been proposed. Some techniques capitalize on inherent LC effects, such as the linear electro-optic effect found in the chiral nematic phase. However, these methods, which rely on intrinsic LC effects, can be limited by the properties and states of the LC materials used, thus potentially lacking sufficient flexibility for certain applications.

Another strategy employs a periodic electrode system to dictate the formation of the LC grating. This electric field-driven technique allows for precise control over LC alignment by adjusting the layout of the electrodes, which in turn modulates the optical properties of the grating. Yet, the dependence on the electrical systems introduces additional complexity and potential failure points, which could impact the reliability and stability of the resultant LC grating, impacting the long-term performance. On the other hand, incorporating a planar aligned polyimide (PI) through rubbing alignment introduces additional fabrication difficulties, potentially affecting the device's diffraction efficiency.

Additionally, an alternative approach exploits an intense polarized UV laser beam to realign LC molecules using patterned masks, thereby forming an LC grating.

However, the devices fabricated using this method always face issues with electrical stability. After several cycles of electrical switching, the diffraction efficiency of the LC grating declines significantly. This arises because this approach necessitates a high azimuthal anchoring energy to return the LC director to its initial alignment post-switching. The photoalignment material that is typically employed to construct the PG provides azimuthal anchoring energy within the range of $10^{-5}$ J/m2, which proves insufficient for maintaining the orientation of LC molecules. Consequently, other works have opted to use a grating structure on a single substrate, while the opposing substrate incorporates a planar aligned polyimide (PI) through rubbing alignment. However, this method may adversely impact the diffraction efficiency of the device and introduces fabrication challenges associated with the rubbing alignment process.

Therefore, considerable obstacles still persist in these methods of fabricating high-efficiency, low-cost, and long-term stable switchable liquid crystal gratings.

SUMMARY

To overcome the shortcomings of existing technology, the present disclosure provides high-efficiency, low-cost, and long-term stable switchable liquid crystal (LC) grating cells and a method for fabricating the same.

The present application further provides a switchable liquid crystal grating cell comprising: a pair of switchable liquid crystal grating parts, each switchable liquid crystal grating part comprises: a substrate; a conductive layer on the substrate; and a photoalignment layer with an alignment pattern above the conductive layer on the substrate, the alignment pattern having first and second types of domains: the first type of domain having a first uniform alignment direction, the second type pf domain having a second uniform alignment direction that is reoriented at a predetermined angle to the first uniform alignment direction, wherein the predetermined angle is 85°-95°; a liquid crystal layer sandwiched between the pair of switchable liquid crystal grating parts; wherein two photoalignment layers in the pair of switchable liquid crystal grating parts face each other, and for the pair of switchable liquid crystal grating parts, an alignment pattern of the photoalignment layer on a top surface of a lower switchable liquid crystal grating part is arranged to be shifted by half a pitch to 45% of a pitch relative to the other alignment pattern of the photoalignment layer on a bottom surface of an upper switchable liquid crystal grating part.

In certain embodiments, the predetermined angle is 90°.

In certain embodiments, the substrate is a transparent glass substrate, and the conductive layer comprises multiple indium tin oxide (ITO) electrodes.

In certain embodiments, the photoalignment layer features periodically alternating alignment directions, resulting in a periodic variation of alignment directions.

In certain embodiments, the switchable liquid crystal grating cell has a period in the range of 4-50 micrometers.

In certain embodiments, the switchable liquid crystal grating cell has a period of 8 micrometers.

In certain embodiments, the photoalignment material of the photoalignment layer is a sulphonic azo dye (SD1).

In certain embodiments, when no electric filed is applied, liquid crystal molecules of the photoalignment layer are arranged periodically along the plane of the substrate; and when an electric field with analog waveforms, such as sine wave or triangle wave, is applied, the long axes of liquid crystal molecules of the photoalignment layer start to align with the direction of the electric field, thus becoming perpendicular to the plane of the substrate.

In certain embodiments, there is a cell gap between the switchable liquid crystal grating cells.

In certain embodiments, the cell gap is in the range of about 1 µm-2 µm.

The present application further provides a method for manufacturing a switchable liquid crystal grating cell, the method comprising: coating a substrate with a conductive layer; spin-coating the substrate with a photoalignment material to establish a photoalignment layer on the conductive layer; exposing the photoalignment layer to a first polarized UV light polarized in a first direction to achieve a uniform orientation of liquid crystal molecules of the photoalignment layer; contacting an amplitude mask with the photoalignment layer of the substrate to expose non-masked areas of the photoalignment layer; irradiating the photoalignment layer with a second polarized UV light polarized in a second direction which is arranged at a predetermined angle to the first direction so as to reorient the non-masked areas of the photoalignment layer, resulting in a switchable liquid crystal grating part with an alignment pattern on the photoalignment layer with first and second types of domains, the first type of domain having a first uniform alignment direction, the second type of domain having a second uniform alignment direction that is reoriented at the predetermined angle to the first direction, wherein the predetermined angle is 85°-95°; arranging a pair of the switchable liquid crystal grating parts, wherein two photoalignment layers in the pair of switchable liquid crystal grating parts face each other, and the alignment patterns of the photoalignment layer on the top surface of the lower switchable liquid crystal grating part shift by half a pitch or less than half a pitch relative to the other alignment patterns of the photoalignment layer on the bottom surface of the upper switchable liquid crystal grating part; and infusing a nematic liquid crystal between the pair of switchable liquid crystal grating parts to obtain a switchable liquid crystal gratings cell.

In certain embodiments, the predetermined angle is 90°.

In certain embodiments, the substrate is a transparent glass substrate, and the conductive layer comprises multiple indium tin oxide electrodes.

In certain embodiments, the photoalignment layer features periodically alternating alignment directions, resulting in a periodic variation of alignment directions.

In certain embodiments, the switchable liquid crystal grating cell has a period in the range of 4-50 micrometers.

In certain embodiments, the switchable liquid crystal grating cell has a period of 8 micrometers.

In certain embodiments, spin-coating the substrate with the photoalignment material comprises: spin-coating a solution including sulphonic azo dye (SD1) dissolved in N, N-dimethylformamide (DMF) solvent on the surface of substrate; and removing the DMF solvent from the coated substrate.

In certain embodiments, when infusing the nematic liquid crystal between the pair of photoalignment layers, one or more photo spacers are configured between the switchable liquid crystal grating cells so as to space the switchable liquid crystal grating cells in a cell gap.

In certain embodiments, the cell gap is in the range of about 1 µm-2 µm.

This disclosure presents an electrically switchable liquid crystal grating cell that demonstrates high efficiency, cost-effectiveness, and durable stability, addressing the limitations observed in existing liquid crystal grating technologies. The liquid crystal grating cell produced through this disclosure exhibits a high diffraction efficiency and maintains it over a long period of time. This results in a grating cell with both excellent performance and enduring reliability.

BRIEF DESCRIPTION OF THE DRAWINGS

Exemplary embodiments of the disclosure are described in the following with respect to the attached figures. The figures and corresponding detailed description serve merely to provide a better understanding of the disclosure and do not constitute a limitation whatsoever of the scope of the disclosure as defined in the claims. In particular:

FIG. 1A shows the step of coating a conductive layer on a substrate according to certain embodiments of the present disclosure. FIG. 1B shows a spin-coating process according to certain embodiments of the present disclosure. FIG. 1C shows a first step of realizing photoalignment and FIG. 1D shows a second step of realizing photoalignment according to certain embodiments of the present disclosure. FIG. 1E is a schematic plot of a mask according to certain embodiments of the present disclosure.

FIG. 2A illustrates the switchable liquid crystal grating cell and the arrangement of the alignment vector of the liquid crystal within the cell without a driving electric field, and FIG. 2B illustrates the switchable liquid crystal grating cell and the arrangement of the alignment vector of the liquid crystal with a driving electric field.

DETAILED DESCRIPTION

The disclosure will be more fully described below with reference to the accompanying drawings. However, the present disclosure may be embodied in a number of different forms and should not be construed as being limited to the embodiments described herein.

The disclosure offers a method for manufacturing an electrically switchable liquid crystal grating part, and the switchable liquid crystal grating part. The disclosure further offers a method for manufacturing an electrically switchable liquid crystal grating cell that can be controlled through the application of an electric field, and the switchable liquid crystal grating cell. This feature allows for the effective tuning of the diffraction angle, which is essential in many photonics applications.

An exemplary embodiment of this disclosure presents a switchable liquid crystal grating part, including transparent glass substrate coated with, e.g. an indium tin oxide electrode. The substrate is further equipped with patterned photoalignment layers undergoing a two-step patterned photoalignment process utilizing an amplitude mask. This treatment configures the substrates to offer multiple alignment regions within the interstitial liquid crystals, thereby establishing a polarization grating profile.

Another exemplary embodiment of this disclosure presents a switchable liquid crystal cell that includes a pair of transparent glass substrates each coated with an indium tin oxide electrode, equipped with two patterned photoalignment layers respectively. A liquid crystal layer is sandwiched between these two transparent substrates. The switchable liquid crystal cell exhibits a high diffraction efficiency and maintains it over a long period of time.

Figure 1A:
FIG. 1A, FIG. 1B, FIG. 1C, FIG. 1D, and FIG. 1E, illustrate an exemplary methodology for preparing liquid crystal grating substrate of a switchable liquid crystal grating cell with desired alignment direction.
Figure 1B:
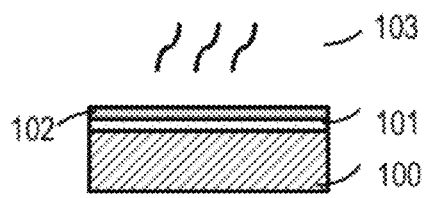

FIGS. 1A-1E illustrate an exemplary methodology for preparing a liquid crystal grating substrate of a switchable liquid crystal grating cell with desired alignment direction. As shown in FIG. 1A, a substrate 100 is provided, the substrate may be transparent, such as a transparent glass substrate. Then, the method comprises the step of coating a conductive layer. A conductive layer 101 is first coated on the upper surface of the substrate 100. The conductive layer 101 comprises a plurality of indium tin oxide (ITO) electrodes. Then, as demonstrated in FIG. 1B, a spin-coating process is applied to the upper surface of the substrate 100 to establish a photoalignment layer 102 on the conductive layer 101. The photoalignment material of the photoalignment layer 102 can be any suitable photoalignment material. The used photoalignment material is based on cross linking or based on photo-degradation process. In certain embodiments, the photoalignment material can be a sulphonic azo dye (SD1), or a commercial azo dye photo-alignment polymer, such as that from DIC Corporation, Japan. This material is known for reorienting perpendicular to the polarization direction of incident polarized UV light. Before the spin-coating process, the SD1 has been dissolved into a solvent, such as N, N-dimethylformamide (DMF) solvent, to form a solution. In the spin-coating process, the solution is spin-coated on the surface of substrate to form a SD1 film on the substrate. After spin-coating the solution, removing the DMF solvent from the coated substrate. Optionally, the substrate with the SD1 film can be baked under an outer heater 103 with a temperature in the range of 80-120° C., or a temperature of 100° C. or above 100° C. or below 100° C. to remove the solvent of the SD1 film so as to achieve the photoalignment layer 102. The other suitable method for removing the DMF solvent from the coated substrate is also acceptable.

Figure 1C:
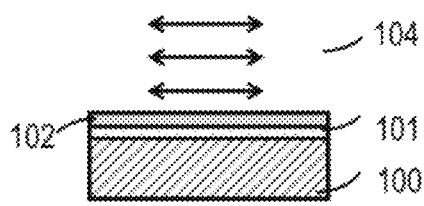
Figure 1D:
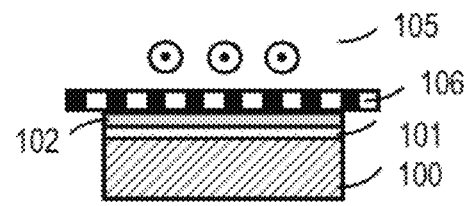

The next step is exposing the photoalignment layer to polarized UV. The substrates coated with the photoalignment material undergo a multiple-step patterned photoalignment process using a shadow photo-mask to create multiple alignment regions. The first step of realizing photoalignment is depicted in FIG. 1C, involving exposing the photoalignment layer 102 to a first polarized UV light 104 polarized in a first direction to achieve a uniform orientation of liquid crystal molecules of the photoalignment layer 102. The uniform orientation refers to the consistent alignment of liquid crystal molecules in a specific preferred direction across the entire domain of the photoalignment layer. The uniform orientation ensures that the liquid crystal molecules have minimal deviation from the desired orientation, promoting efficient device operation. The second step of realizing photoalignment is depicted in FIG. 1D, which involves closely contacting a mask 106 with the substrate to expose non-masked areas of the photoalignment layer, and then irradiating the substrate with a second polarized UV light 105 polarized in a second direction which is arranged at a predetermined angle to the first direction so as to reorient the non-masked areas of the photoalignment layer 102. The predetermined angle between the first direction and the second direction is in the range of 85 degrees to 95 degrees, for example, 86 degrees, 87 degrees, 88 degrees, 89 degrees, 90 degrees, 91 degrees, 92 degrees, 93 degrees, 94 degrees. The above predetermined angle could achieve relatively acceptable efficiency. The above nearly orthogonal orientation between the LC molecules in adjacent domains can provide diffraction efficiency, which may vary depending on the exact angle. Preferably, when the predetermined angle is 90 degrees, the orthogonal orientation between the LC molecules in adjacent domains ensures maximum phase difference between adjacent domains, thereby resulting in optimal high diffraction efficiency. As the predetermined angle deviates from 90 degrees, the diffraction efficiency tends to decrease.

Figure 1E:
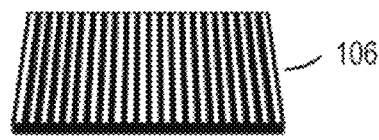

The mask 106 is a shadow photomask with specially designed opaque and transparent domains. As shown in FIG. 1E, the mask 106, which can be referred to as an amplitude mask, is made of, for example, chromium alloy, and features alternating light-transmitting and opaque stripes with a predetermined period, including but not limited to, a period within about 2 μm-6 μm or about 3 μm-5 μm, such as about 3.5 μm, about 4 μm, or about 4.5 μm. The mask 106 is used for fabricating the active liquid crystal grating part. The exceptionally small periodicity of the mask, which is employed in the present disclosure, leads to the method and the obtained liquid crystal polarization grating parts with high efficiency. In the above steps, the SD1, which shows exceptional alignment malleability, allows the orientation of the masked areas of the photoalignment layer and the change of the orientation of the non-masked areas of the photoalignment layer through additional irradiation, all the while maintaining the same quality of alignment. Consequently, the resulted alignment pattern on the photoalignment layer has first and second types of domains: the first type of domain having a first uniform alignment direction, the second type of domain having a second uniform alignment direction that is reoriented at a predetermined angle to the first uniform alignment direction. The predetermined angle of the first direction relative to the second direction is in the range of 85 degrees to 95 degrees, preferably about 90 degrees. This characteristic greatly enhances the feasibility of the multi-domain alignment approach. Thus, in certain embodiments, the second irradiation step induces the SD1 reorientation in the non-masked areas to be perpendicular to the light polarization direction, and hence to the molecular orientation in the obscured regions. These manipulations result in a liquid crystal grating part with a periodic variation of the alignment directions, creating a patterned liquid crystal grating part. The above arrangement introduces variations in the LC refractive index, thereby creating a polarization grating profile.

The above provides a two-step photoalignment process using an amplitude mask according to certain embodiments of the present disclosure. The two-step photoalignment process as stated above and shown in FIGS. 1C and 1D induces multiple alignment regions within the liquid crystal on the substrate, leading to the creation of a polarization liquid crystal grating profile.

Figure 2A:
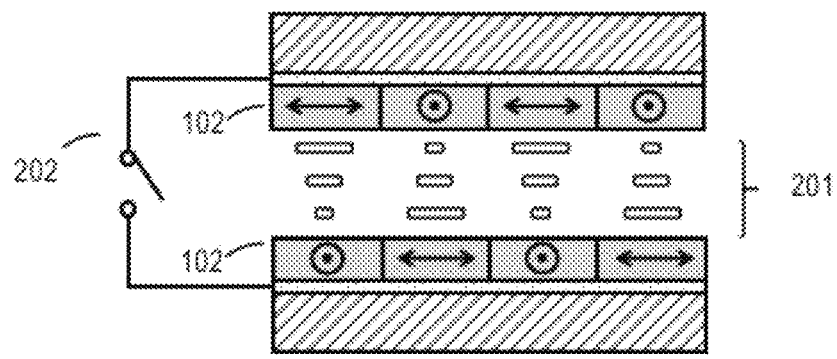
FIG. 2A and FIG. 2B illustrate the switchable liquid crystal grating cell and the arrangement of the alignment vector of the liquid crystal within the cell according to certain embodiments of the present disclosure. In particular.

The present application further provides a switchable liquid crystal grating cell which comprises a pair of liquid crystal grating parts and a method for manufacturing the same. Following the fabrication of the two photoalignment layers 102 with periodically alternating alignment directions, two substrates respectively with the two photoalignment layers 102 are provided to form the liquid crystal cell as illustrated in FIG. 2A. The two photoalignment layers 102 are arranged on the two substrates as a top surface and a bottom surface respectively, and undergo identical treatment processes.

In certain embodiments, the method comprises providing one or more pairs of switchable liquid crystal grating parts manufactured according to the method above, wherein two photoalignment layers in each pair of switchable liquid crystal grating parts face each other. The alignment pattern of the photoalignment layer on the top surface of the lower switchable liquid crystal grating part shifts by half a pitch or less than half a pitch relative to the other alignment pattern of the photoalignment layer on the bottom surface of the upper switchable liquid crystal grating part. Recognizing the realities of fabrication, the shift might be slight deviations due to manufacturing constraints and other intrinsic processes, i.e. less than half a pitch of the liquid crystal grating part structure. The character "less than half a pitch" means at most 45% of the liquid crystal grating part structure. As shown in FIG. 2A, the patterns on the top and bottom surfaces of the two substrates are shifted by about half a pitch. Thus the alignment direction of the photoalignment layer in a domain of the lower switchable liquid crystal grating part can be perpendicular to the alignment direction of the photoalignment layer at the above corresponding domain of the upper switchable liquid crystal grating part. And then a nematic liquid crystal 201 is infused between the two photoalignment layers of the pair of switchable liquid crystal grating parts, so as to obtain a switchable liquid crystal grating cell. The nematic liquid crystal can be any kind of suitable nematic liquid crystal characterized by dielectric and optical anisotropy, such as E7 (obtained from EM Industries, Inc.). The effective area size of the switchable liquid crystal grating cell can be in the range between 1.5 cm×1.5 cm to 0.8 cm×0.8 cm, for example, 1.4 cm×1.4 cm, 1.3 cm×1.3 cm, 1.2 cm×1.2 cm, 1.1 cm×1.1 cm, 1 cm×1 cm, 0.9 cm×0.9 cm. Generally, one cell can contain more than 100,000 orthogonal domains, such as 105,000, 110,000, 115,000, 120,000, 125,000, 130,000, 135,000, 140,000 orthogonal domains per cell. When forming the cells, gaps can be disposed between the cells. For example, the cell gap can be in the range of about 1-2 μm, about 1.3-1.8 μm, about 1.4 μm, about 1.5 μm, or about 1.6 μm. The cell gap is substantially uniform in length over an area of each photoalignment layer. An acceptable variation of the cell-gap length over this area shall be determined by those skilled in the art according to a practical situation in using the cell. The difference in alignment directions in adjacent domains of the liquid crystal grating cells gives rise to variations in the LC refractive index. This is due to the varying twist of the LC director within these domains. As a result, the depicted LC director orientation is obtained as shown in FIG. 2A. Nematic liquid crystals are oriented between two substrates, such as two ITO glass plates. The LC molecules are arranged periodically along the plane of the substrate. Within one period, the orientation of the liquid crystal molecules in one domain rotates 180° relative to the adjacent domain. In this way, multiple alignment regions can be offered, making the fabrication of small-period switchable liquid crystal grating cell with satisfactory alignment quality possible.

Such cell gaps can be ensured by using photo spacers. The photo spacers can be introduced during the manufacturing process to ensure uniform cell thickness and maintain the appropriate distance between the layers. Once the manufacturing process is completed, these spacers may remain within the cell structure to continuously provide the intended separation and maintain the structural integrity of the cells.

In the circumstance shown by FIG. 2A, the electrical circuit connected to the liquid crystal cell is open, as illustrated by 202, indicating that no voltage is applied to it. As the patterns on the top and bottom surfaces of the substrates of the liquid crystal grating cell are shifted by half a pitch or by less than half a pitch and the LC molecules rotate an angle, such as about 180°, the liquid crystal cell exhibits a polarization grating profile. The liquid crystal cell provides alignment layers with strong anchoring energy and ensures that the switchable liquid crystal cell can endure multiple switching cycles. This arrangement results in a high diffraction efficiency and stability.

Figure 2B:
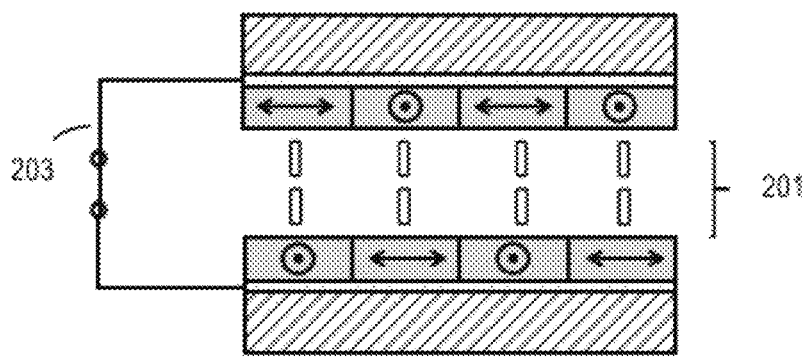

FIG. 2B visually presents the deformation of the LC director in a liquid crystal cell when an electric field 203 is applied to the liquid crystal cell. By applying an AC voltage, such as AC triangular voltage or AC sine wave, above the threshold value, positive liquid crystals between the liquid crystal grating parts begin to reorient. Specifically, the long axes of the liquid crystal molecules start to align with the direction of the electric field, thus becoming perpendicular to the substrate plane. Ideally, the liquid crystal's birefringence approaches zero, causing the diffraction effect to vanish.

Figure 3:
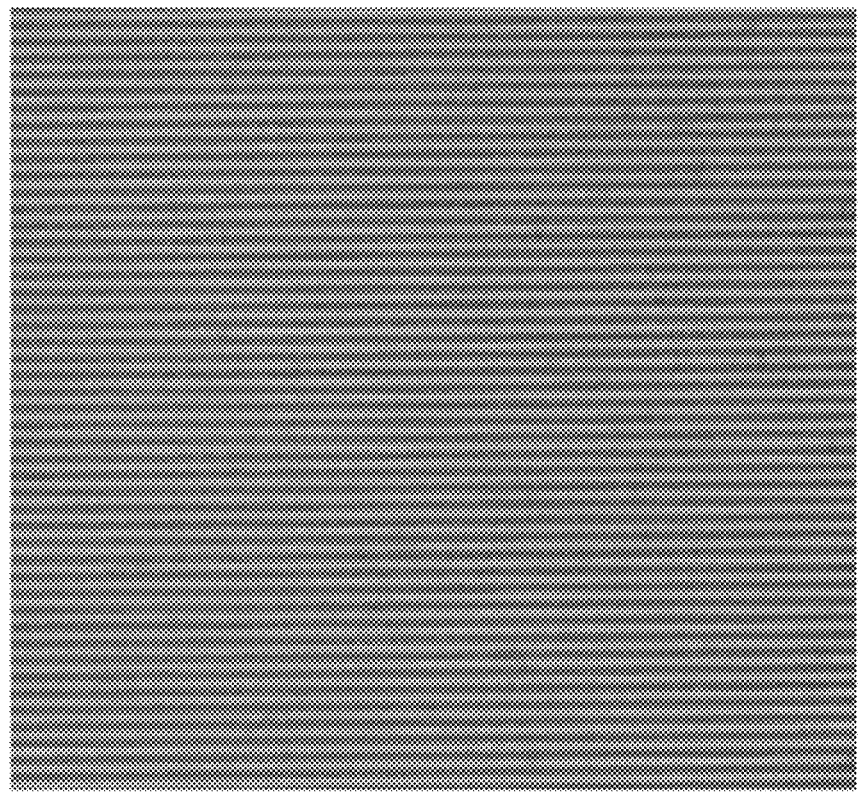
FIG. 3 presents the microscope photograph of the fabricated liquid crystal grating cell under crossed polarizers according to certain embodiments of the present disclosure.

The switchable liquid crystal cell as described above and shown in FIG. 2A can achieve successful realization of a small-period switchable liquid crystal grating part with satisfactory alignment quality through the implementation of the methods detailed in this disclosure, which will also result in a high diffraction efficiency. FIG. 3 provides a visual representation of the switchable liquid crystal grating cell created through the procedure as disclosed in this disclosure, as seen under a microscope. As shown in FIG. 3, the discernible pattern is marked by equally spaced bright and dark stripes, indicating a grating with a consistent period. An acceptable variation in the length of period shall be determined by those skilled in the art according to a practical situation in using the cell. The liquid crystal grating developed in certain embodiments showcases a smaller period compared to traditional gratings. Optionally, the switchable liquid crystal grating may have a period in the range of about 4-50 micrometers, such as about 7-40 micrometers, about 12-30 micrometers, about 14-28 micrometers, about 18-25 micrometers, about 20-23 micrometers, about 21-22 micrometers, about 5 micrometers, about 6 micrometers, about 8 micrometers, about 9 micrometers, about 10 micrometers, about 11 micrometers, about 13 micrometers, about 15 micrometers, or about 16 micrometers. The above small period enhances the grating's ability to steer light over a broad range. The grating's period corresponds directly with the period of the amplitude mask utilized in the above process. Captured under cross-polarized light, the image exhibits the well-structured grating pattern of the liquid crystal grating fabricated by the certain embodiments, compared with the liquid crystal gratings tending to have periods longer than 50 micrometers or even larger in the prior art. Within the field of photonics, it is of utmost importance to fabricate gratings with periods less than 10 micrometers. This significance is underscored by the fact that the period of a grating directly influences its diffraction angle, which in turn denotes the grating's ability to steer light. The liquid crystal grating of the present disclosure can achieve a smaller grating period, resulting in larger diffraction angles, thereby enhancing the capacity to control light direction over a broad range. This precise manipulation of light directionality is critical for many photonics applications, including high-resolution imaging, laser beam steering, and optical switching.

Figure 4A:
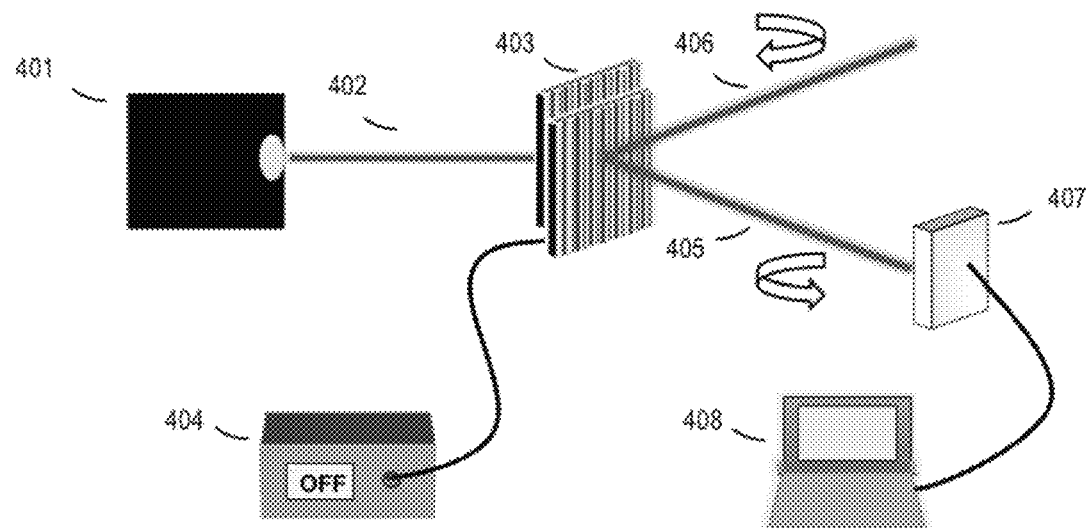
FIG. 4A illustrates the experimental setup utilized to investigate the diffraction and electro-optical properties of the switchable liquid crystal grating cell when no electric field is applied.

The performance of the liquid crystal cell as described above can be proved by the experimental setup as shown in FIG. 4A. FIG. 4A illustrates the experimental setup utilized to investigate the diffraction and electro-optical properties of the liquid crystal gratings. In FIG. 4A, a He—Ne laser 401 emits a beam directed perpendicularly onto the liquid crystal grating cell 403, which is the switchable liquid crystal cell as shown in FIG. 2A. This incident beam 402 is un-polarized and has a wavelength in a range of about 600-700 nm, for example, in a range of about 620-680 nm, such as a wavelength of about 625 nm, about 628.8 nm, about 632.8 nm, about 642.8 nm, about 650 nm, about 660 nm, or about 670 nm. The electrodes of the liquid crystal grating cell 403 is connected to a power source 404, but the power source 404 is in an OFF state and no voltage is applied. In the absence of voltage, the inherent variation in liquid crystal director order (average direction of the long molecular axes of all molecules in the liquid crystal) within the liquid crystal grating leads to the diffraction of the incident beam into multiple orders. Once the un-polarized light beam impinges on the LC grating, the first-order diffracted beams 405 and 406 from the LC grating cell emit along the light paths in different directions, such as two directions, and manifest as orthogonally circularly polarized light. The intensity of the first-order diffracted beam can be captured by a photo detector 407.

Figure 4B:
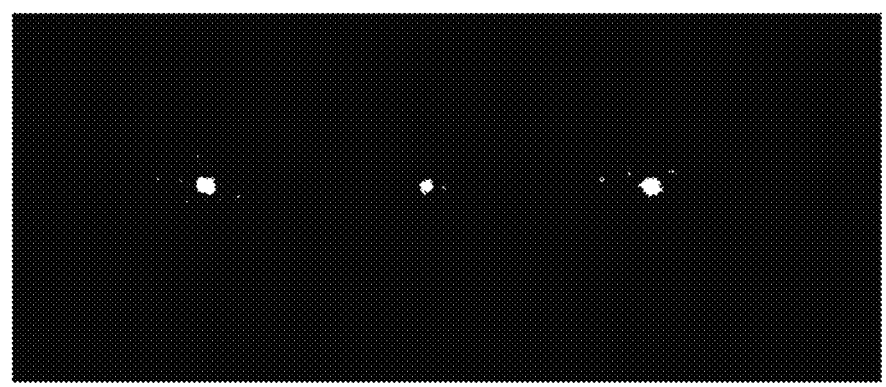
FIG. 4B displays the diffraction pattern of the emergent light beam correspondingly.

FIG. 4B shows the diffraction pattern of the emergent light beam without electric field, such diffraction pattern is obtained by using the experimental setup as shown in FIG. 4A. Ideally, when the phase delay of the LC layer equals half of the target working wavelength, the LC grating achieves its optimum thickness. At this point, theoretically, the diffraction efficiency should reach 100%, which means the output light only consists of the first-order (+1 and −1) diffracted beams and lacks the zeroth order. However, due to inaccuracies during fabrication, this specific LC grating example as shown in FIG. 4B doesn't achieve a 100% diffraction efficiency. A detailed discussion regarding diffraction efficiency will be further provided in FIG. 6.

Figure 5A:
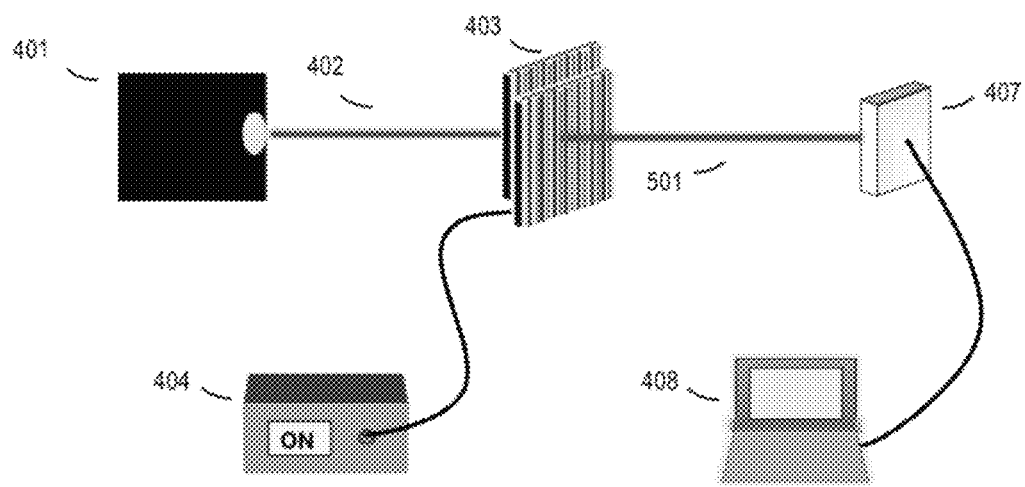
FIG. 5A illustrates the experimental setup utilized to investigate the diffraction and electro-optical properties of the switchable liquid crystal grating cells when an electric field is applied.

FIG. 5A illustrates the situation when the switchable liquid crystal grating cell is connected to a power source 404. If the applied electric field is above a predetermined threshold value, the LC director orientation becomes homeotropic. For example, when E7 has been used as the nematic liquid crystal, the predetermined threshold value of electric field is in the range of 0.8V-1.2V, such as about 0.9V, 0.95V, 1V, 1.05V, 1.1V, 1.15V. Optional, the possible range of the predetermined threshold value can vary depending on the LC materials using, the specifics of the device configuration and the environment conditions.

Figure 5B:
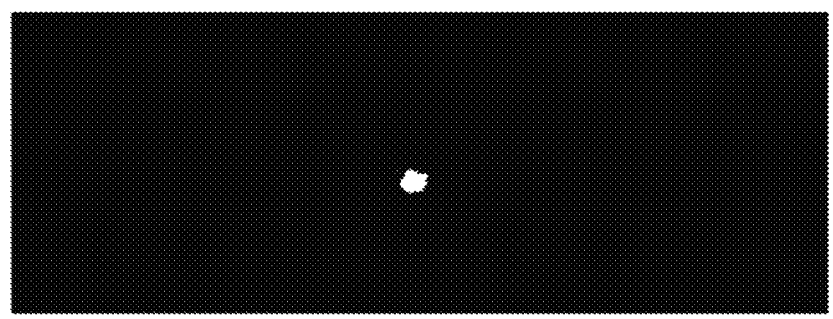
FIG. 5B displays the diffraction pattern of the emergent light beam correspondingly.

Thus, it essentially eradicates the variations in the refractive index across adjacent zones of the LC grating cells, meaning that the periodic phase distribution and grating structure disappear. As a result, as shown in FIG. 5A, only the zero-order diffraction 501 is present in the output beam emitting along one direction. The polarization state of the zeroth-order diffraction light is the same as that of the incident light. Thus, the electro-optic control of the orientation process for the LC grating cell of certain embodiments allows effective tuning of the diffraction angle in the LC grating cell. The diffraction pattern is demonstrated in FIG. 5B. In certain embodiment, the photodetector 407 is also used to measure the light intensity of the zeroth-order diffraction spot. It thus can be seen that, the switchable liquid crystal grating cell can achieve the grating's precise control of light directionality so as to optimize signal transmission, making it suitable for telecom companies and data centers.

Besides the embodiment discussed above, other embodiments could involve use of left-handed or right-handed polarized light as incident light. For example, in certain embodiments, a left-handed circularly polarized light may be used as incident light. When the applied electric field is above a predetermined threshold value, and a left-handed circularly polarized light incidents on the LC grating cell described in certain embodiments, the variations in the refractive index across adjacent zones of the LC grating cells can be eradicated. In this way, only the +1 order right-handed circularly polarized light can be produced as the output beam along one direction. In certain embodiments, a right-handed circularly polarized light may be used as incident light. When the applied electric field is above a predetermined threshold value, and a right-handed circularly polarized light incidents on the LC grating cell as described in certain embodiments, the variations in the refractive index across adjacent zones can also be eradicated, and only the −1 order right-handed circularly polarized light can be produced as the output beam along one direction.

Figure 6:
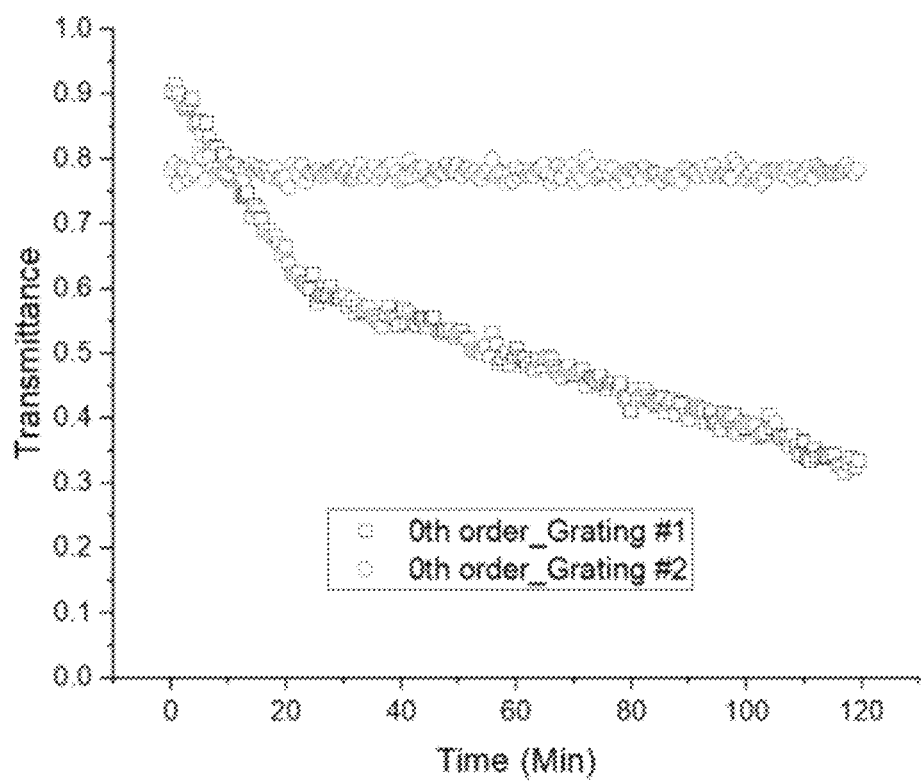
FIG. 6 is the graph showing the long-term diffraction efficiency of the fabricated polarization grating cells according to certain embodiments in the present disclosure and the polarization grating cells in the prior art.

FIG. 6 illustrates the long-term diffraction efficiency of two types of liquid crystal polarization gratings, Grating #1 and Grating #2. Grating #1 represents the liquid crystal grating prepared by traditional methods, wherein only one side of the substrate has a grating orientation. On the other hand, Grating #2, manufactured using the method proposed in certain embodiments, has both the upper and lower substrates featuring periodically alternating alignment directions, with the patterns on the top and bottom surfaces being offset by half a pitch or less than half a pitch. The transmittance of the 0th order diffraction spot over an extended duration has been monitored, upon applying a voltage of 10V to each LC grating. As depicted in FIG. 6, Grating #2 maintained a stable high diffraction efficiency of around 70% over the long term. In contrast, the intensity of the 0th order diffraction spot for Grating #1 dropped swiftly. This decline is due to the electrical stability problems that devices fabricated using conventional methods continually encounter. After several cycles of electrical switching, the LC grating's diffraction efficiency significantly decreases. This decrease is primarily due to the high azimuthal anchoring energy required to reorient the LC director to its initial alignment after switching. The method proposed in certain embodiments t leads to a liquid crystal grating with an enduring and consistently high diffraction efficiency. Therefore, the presented fabrication method of electrically switchable liquid crystal diffraction gratings not only enables the achievement of high diffraction efficiency but also ensures sustainable stability over a long period of time.

The methods provided in certain embodiments offer a reliable approach to create liquid crystal gratings and liquid crystal grating cells that exhibit both excellent performance and long-term reliability, making them suitable for various practical applications requiring stable and efficient diffraction characteristics.

The liquid crystal grating cell proposed in the present disclosure can be used in multiple of applications, such as industrial manufacturing, medical surgeries, and military applications utilizing the grating's precise laser control, and could improve the laser cutting, engraving, and targeting systems. Further, the provided liquid crystal grating cell could be employed in LiDAR systems for autonomous vehicles and optical communication systems to increase data transfer rates. Moreover, the liquid crystal grating cell can be used to improve the clarity and detail of imaging systems, such as microscopes, telescopes, and cameras.

The invention provided in the present disclosure offers an advanced solution in the field of switchable liquid crystal gratings by providing a high-performance, low-cost, and long-term stable device with precise control over light directionality, a critical feature for many photonic applications.

High Efficiency: The switchable liquid crystal grating developed by this invention showcases a high diffraction efficiency. This is beneficial for applications that require efficient light management, such as high-resolution imaging and optical switching.

Low Cost: The use of cost-effective materials and the implementation of a straightforward fabrication process, which can be easily replicated, reduces the overall cost of producing these gratings, making this solution more economically viable.

Long-term Stability: Traditional liquid crystal gratings often suffer from a decline in diffraction efficiency over time due to electrical stability issues. This invention successfully addresses this problem by introducing a liquid crystal grating with enduring and consistently high diffraction efficiency.

Small Grating Periods: Many existing liquid crystal gratings have periods longer than 50 micrometers. However, the liquid crystal grating developed here features a smaller period of 8 micrometers, enhancing its capacity to control light direction over a broader range. This is particularly important in the field of photonics where controlling light directionality is critical.

High Performance and Reliability: The gratings produced by the present method not only exhibit excellent performance but also maintain this performance reliably over an extended period. This is ideal for practical applications that require stable and efficient diffraction characteristics.

Improved Fabrication Method: The two-step photoalignment process using an amplitude mask leads to the creation of multiple alignment regions, which is a significant improvement over traditional methods where only one side of the substrate has a grating orientation.

The use of the term "about" is before a quantitative value, the present teachings also include the specific quantitative value itself, unless specifically stated otherwise. As used herein, the term "about" refers to a ±10%, ±7%, ±5%, ±3%, ±1%, or ±0% variation from the nominal value unless otherwise indicated or inferred.

The embodiments or elements showcased within this disclosure, including the specific illustrations and materials utilized in examples, are intended to be illustrative, not restrictive. They allow for a wide range of alterations, adjustments, or adaptations that align with the fundamental concept of the present disclosure. It's important to clarify that all depicted diagrams are solely for illustrative purposes; they are neither to scale nor are they precise reproductions of actual devices.

Wherever not already described explicitly, individual embodiments, or their individual aspects and features, described in relation to the drawings can be combined or exchanged with one another without limiting or widening the scope of the described disclosure, whenever such a combination or exchange is meaningful and in the sense of this disclosure. Advantages which are described with respect to a particular embodiment of present disclosure or with respect to a particular figure are, wherever applicable, also advantages of other embodiments of the present disclosure.

LIST OF REFERENCES

There follows a list of references that are occasionally cited in the specification. Each of the disclosures of these references is incorporated by reference herein in its entirety.

[1] Hu W, Srivastava A, Xu F, et al. Liquid crystal gratings based on alternate TN and PA photoalignment [J]. Optics Express, 2012, 20(5): 5384-5391.

[2] Guo Q, Srivastava A K, Chigrinov V G, et al. Polymer and azo-dye composite: a photo-alignment layer for liquid crystals [J]. Liquid crystals, 2014, 41(10): 1465-1472.

[3] Srivastava A K, Wang X Q, Gong S Q, et al. Micro-patterned photo-aligned ferroelectric liquid crystal Fresnel zone lens [J]. Optics letters, 2015, 40(8): 1643-1646.

[4] Węgłowski R, Kozanecka-Szmigiel A, Piecek W, et al. Electro-optically tunable diffraction grating with photoaligned liquid crystals [J]. Optics Communications, 2017, 400: 144-149.

[5] Cheng Y, Sun Z, Yuan Z, et al. P-12.10: Fast Switchable Depth-ranging System Based on Combination of Liquid Crystal Polarization Grating and Ferroelectric Liquid Crystal Dammann Grating [C]//SID Symposium Digest of Technical Papers. 2022, 53(S1): 966-969.

[6] He Z, Nose T, Sato S. Polarization properties of an amplitude nematic liquid crystal grating [J]. Optical Engineering, 1998, 37(11): 2885-2898.

[7] Fujieda I. Liquid-crystal phase grating based on in-plane switching [J]. Applied Optics, 2001, 40(34): 6252-6259.

[8] Ono H, Emoto A, Takahashi F, et al. Highly stable polarization gratings in photocrosslinkable polymer liquid crystals [J]. Journal of applied physics, 2003, 94(3): 1298-1303.

[9] Kapoustine V, Kazakevitch A, So V, et al. Simple method of formation of switchable liquid crystal gratings by introducing periodic photoalignment pattern into liquid crystal cell [J]. Optics communications, 2006, 266(1): 1-5.

[10] Wu W Y, Fuh A Y G. Rewritable liquid crystal gratings fabricated using photoalignment effect in dye-doped poly (vinyl alcohol) film [J]. Japanese Journal of Applied Physics, 2007, 46(10R): 6761.

What is claimed is:

1. A method for manufacturing a switchable liquid crystal grating cell, the method comprising:
coating a substrate with a conductive layer;
spin-coating the substrate with a photoalignment material to establish a photoalignment layer on the conductive layer;
exposing the photoalignment layer to a first polarized UV light polarized in a first direction to achieve a uniform orientation of liquid crystal molecules of the photoalignment layer;
contacting an amplitude mask with the photoalignment layer of the substrate to expose non-masked areas of the photoalignment layer;
irradiating the photoalignment layer with a second polarized UV light polarized in a second direction which is arranged at a predetermined angle to the first direction so as to reorient the non-masked areas of the photoalignment layer to thereby result in a switchable liquid crystal grating part with an alignment pattern on the photoalignment layer with first and second types of domain, the first type of domain having a first uniform alignment direction, the second type of domain having a second uniform alignment direction that is reoriented at the predetermined angle to the first direction, wherein the predetermined angle is 85° to 95°, and wherein the amplitude mask is formed with alternating light-transmitting and opaque stripes with a predetermined period for defining the non-masked areas, the predetermined period being selected to be a small period within 2 μm to 6 μm such that using the amplitude mask with the small period to fabricate the switchable liquid crystal grating part leads to the switchable liquid crystal grating part with a high diffraction efficiency;

arranging a pair of the switchable liquid crystal grating parts, wherein two photoalignment layers in the pair of switchable liquid crystal grating parts face each other, and the alignment patterns of the photoalignment layer on the top surface of the lower switchable liquid crystal grating part shift by half a pitch or less than half a pitch relative to the other alignment patterns of the photoalignment layer on the bottom surface of the upper switchable liquid crystal grating part such that electrical stability of the switchable liquid crystal grating cell as manufactured is significantly enhanced; and infusing a nematic liquid crystal between the pair of switchable liquid crystal grating parts to obtain the switchable liquid crystal grating cell.

2. The method of claim 1, wherein the predetermined angle is 90°.

3. The method of claim 1, wherein the substrate is a transparent glass substrate, and the conductive layer comprises multiple indium tin oxide (ITO) electrodes.

4. The method of claim 1, wherein the switchable liquid crystal grating cell has a period in the range of 4-50 micrometers.

5. The method of claim 1, wherein the switchable liquid crystal grating cell has a period of 8 micrometers.

6. The method of claim 1, wherein spin-coating the substrate with the photoalignment material comprises:
    spin-coating a solution comprising sulphonic azo dye (SD1) dissolved in N, N-dimethylformamide (DMF) solvent on a surface of the substrate; and
    removing the DMF solvent from the coated substrate.

7. The method of claim 1, wherein when infusing the nematic liquid crystal between the pair of photoalignment layers, one or more photo spacers are configured between respective pair of switchable liquid crystal grating cells so as to space the switchable liquid crystal grating cells in a cell gap.

8. The method of claim 7, wherein the cell gap is in the range of 1 μm-2 μm.

9. A switchable liquid crystal grating cell manufactured by the method of claim 1.

10. The switchable liquid crystal grating cell of claim 9, wherein the switchable liquid crystal grating cell has a period in the range of 4-50 micrometers.

11. The switchable liquid crystal grating cell of claim 9, wherein the switchable liquid crystal grating cell has a period of 8 micrometers.

12. The switchable liquid crystal grating cell of claim 9, wherein the photoalignment material is sulphonic azo dye (SD1).

13. The switchable liquid crystal grating cell of claim 9, wherein when no electric filed is applied, liquid crystal molecules of the photoalignment layer are arranged periodically along the plane of the substrate; and when an electric field is applied, the long axes of liquid crystal molecules of the photoalignment layer start to align with the direction of the electric field, thus becoming perpendicular to the plane of the substrate.

* * * * *